United States Patent
Oguri et al.

(10) Patent No.: US 8,556,767 B2
(45) Date of Patent: Oct. 15, 2013

(54) AUTOMATIC TRANSMISSION

(75) Inventors: Kazuo Oguri, Hiroshima (JP); Kenichi Watanabe, Machida (JP); Takayoshi Urushibata, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/483,581

(22) Filed: May 30, 2012

(65) Prior Publication Data

US 2012/0316025 A1 Dec. 13, 2012

(30) Foreign Application Priority Data

Jun. 7, 2011 (JP) ................................ 2011-126825

(51) Int. Cl.
*F16H 3/44* (2006.01)
(52) U.S. Cl.
USPC ........... 475/284; 475/288; 475/311; 475/313; 475/323; 475/325
(58) Field of Classification Search
USPC .......... 475/271, 284, 288, 311–316, 323–328
See application file for complete search history.

(56) References Cited

U.S. PATENT DOCUMENTS

| | | | |
|---|---|---|---|
| 5,525,117 A * | 6/1996 | Morisawa et al. ............ | 475/281 |
| 5,951,433 A | 9/1999 | Tsukamoto et al. | |
| 6,790,155 B2 * | 9/2004 | Ishimaru ....................... | 475/275 |
| 7,967,716 B2 * | 6/2011 | Aoki et al. .................... | 475/282 |

FOREIGN PATENT DOCUMENTS

| | | |
|---|---|---|
| JP | 02-038738 A | 2/1990 |
| JP | 02-047456 U | 3/1990 |
| JP | 08-121550 A | 5/1996 |
| JP | 10-169730 A | 6/1998 |

OTHER PUBLICATIONS

P. Tenberge, "E-Automat Automatikgetriebe Mit Esprit", VDI Berichte, No. 1610, Jan. 1, 2001, pp. 455-479.

* cited by examiner

*Primary Examiner* — Tisha Lewis
(74) *Attorney, Agent, or Firm* — Foley & Lardner LLP

(57) ABSTRACT

An automatic transmission including a Ravigneaux planetary gear unit, an input member, an output member disposed on one side of the Ravigneaux planetary gear unit, five friction elements disposed on the other side of the Ravigneaux planetary gear unit, and a partition member cooperating with an automatic transmission case to define a transmission chamber in which the output member, the Ravigneaux planetary gear unit, and the respective friction elements are accommodated. The output member is supported on a cylindrical portion extending from the partition member toward the Ravigneaux planetary gear unit in an axial direction of the input member.

4 Claims, 10 Drawing Sheets

REAR ← → FRONT

|  | 13R/C | 234/C | 12/B | 4/B | Rev/B |
|---|---|---|---|---|---|
| 1st | O | – | O | – | – |
| 2nd | – | O | O | – | – |
| 3rd | O | O | – | – | – |
| 4th | – | O | – | O | – |
| Rev | O | – | – | – | O |

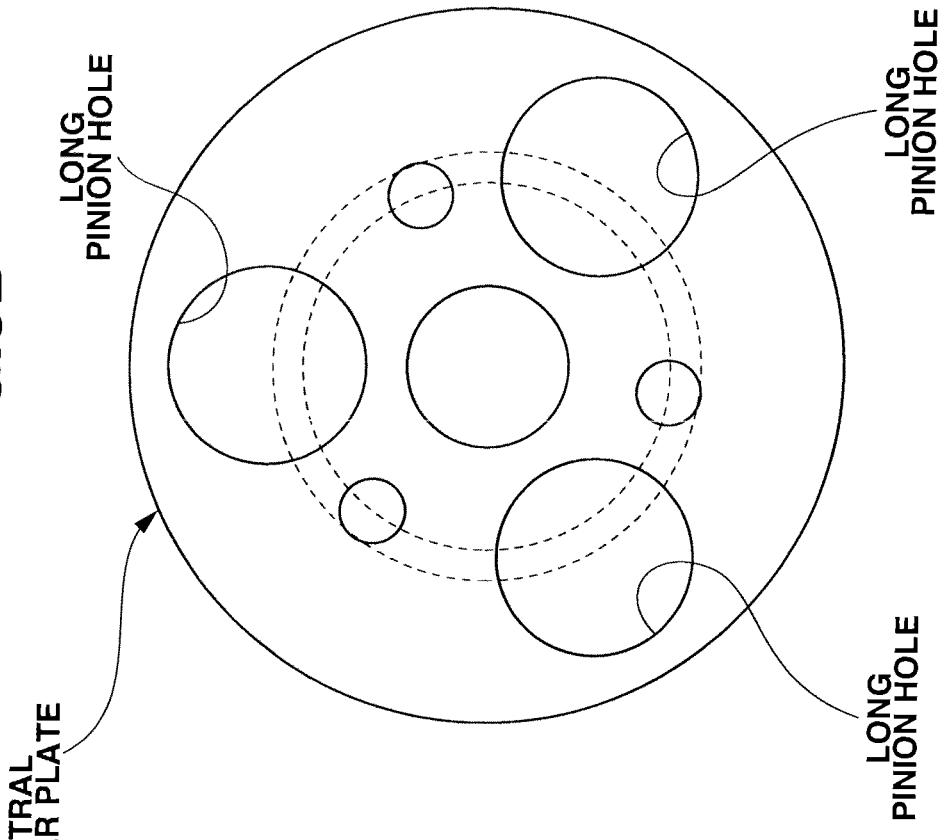
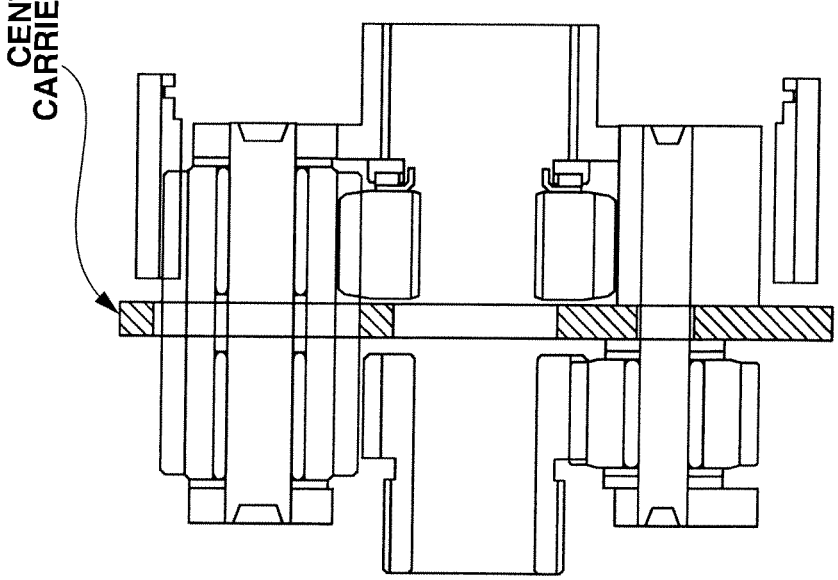
FIG.5A
FIG.5B

1st

2nd

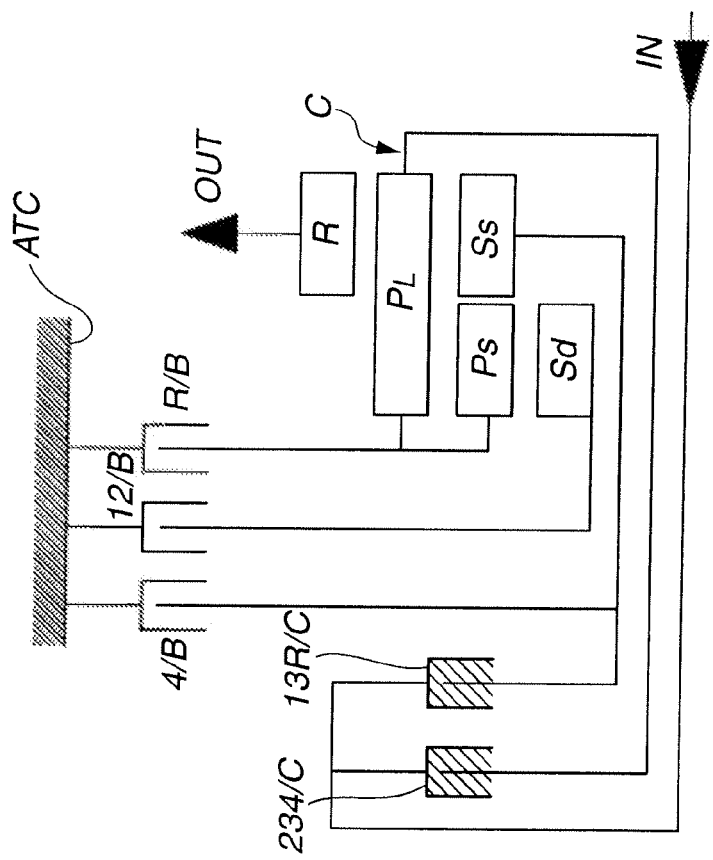

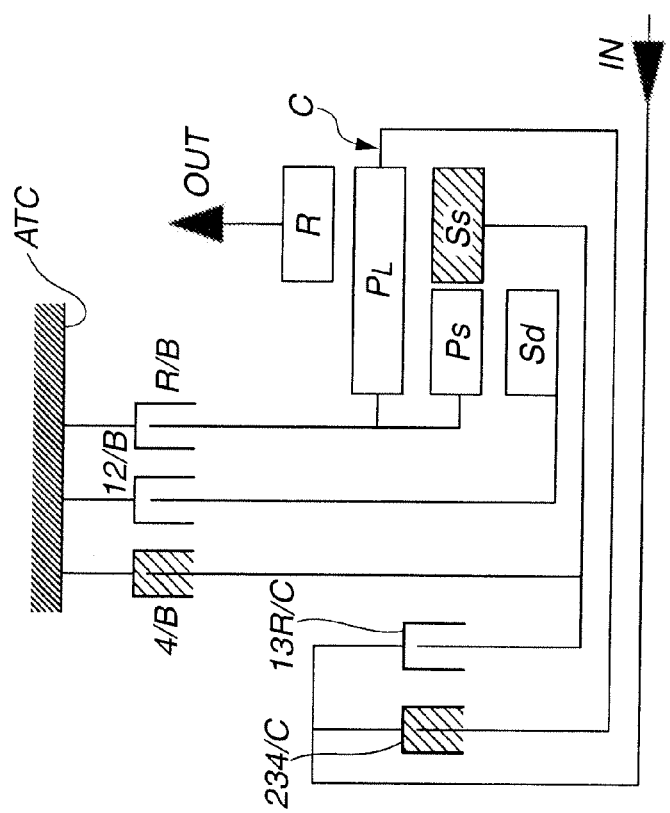
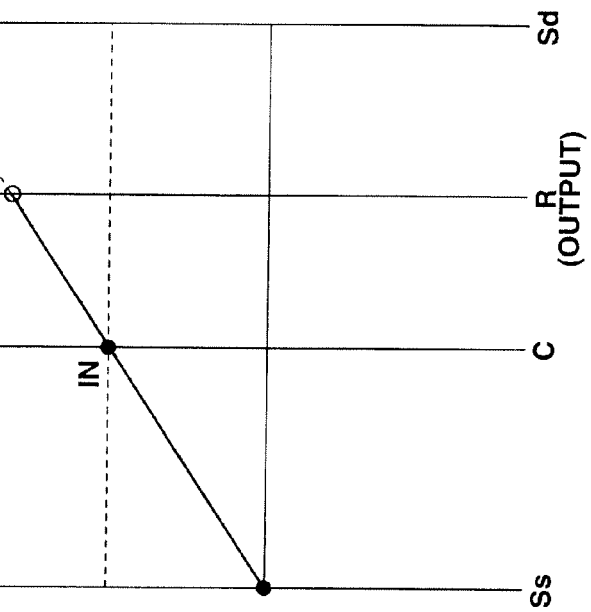
FIG.9A
FIG.9B

US 8,556,767 B2

AUTOMATIC TRANSMISSION

BACKGROUND OF THE INVENTION

The present invention relates to an automatic transmission which can realize four forward speeds and one reverse speed by combination of engagement and disengagement of five friction elements through a Ravigneaux planetary gear unit.

There has been proposed an automatic transmission that realizes four forward speeds and one reverse speed by combination of engagement and disengagement of two clutches and three brakes through a Ravigneaux planetary gear unit (a composite planetary gearset composed of two planetary gearsets). Japanese Patent Application Unexamined Publication No. 10-169730 discloses such an automatic transmission in FIG. 9A and FIG. 9B.

However, in the automatic transmission as shown in FIG. 9B of the above conventional art, the following problems are caused due to a layout of the components used.

(1) Deterioration in Noise and Vibration Performance (NV Performance) of an Output Gear:

Brake B1 is disposed on an inner circumferential side of the output gear, and the output gear is supported on a transmission case through a hub member of brake B1. Due to the intervention of the hub member of brake B1 between the output gear and the transmission case, a backlash of the output gear is larger than that in a case where the output gear is directly supported by the transmission case. As a result, noise and vibration tend to be generated from the output gear. Further, in the layout in which the hub member of brake B1 is disposed on the inner circumferential side of the output gear, if it is intended to directly support the output gear by the transmission case, an intermediate wall for supporting the output gear must be provided to thereby cause upsizing of the transmission and an increase in cost.

(2) Upsizing of a Control Valve Body and Increase in Cost:

Hydraulic passages on the side of the transmission case and hydraulic passages on the side of the control valve must be connected with each other on one side of the output gear and on the other side of the output gear. For this reason, upsizing of the control valve body is caused, thereby resulting in an increase in cost.

(3) Upsizing of a Common Carrier and Increase in Cost:

A rotary member between a common carrier and clutch C-2 is disposed between two sun gears. Due to this arrangement, a central carrier plate must be additionally provided at a central portion of the common carrier. For this reason, upsizing of the common carrier is caused, thereby resulting in an increase in cost.

The present invention has been made in view of the above problems. It is an object of the present invention to provide an automatic transmission that is capable of enhancing NV performance of an output member and suppressing upsizing of a control valve body and a common carrier to thereby reduce costs thereof.

In a first aspect of the present invention, there is provided an automatic transmission including:

a Ravigneaux planetary gear unit comprising a front sun gear, a rear sun gear, a ring gear, a long pinion meshing with the front sun gear and the rear sun gear, a short pinion meshing with the rear sun gear and the long pinion, and a common carrier on which the long pinion and the short pinion are rotatably supported;

an input member to which rotation of a drive source is inputted;

a first friction element that selectively connects the input member and the front sun gear with each other;

a second friction element that selectively connects the input member and the common carrier with each other;

a third friction element that selectively fixes the rear sun gear to an automatic transmission case;

a fourth friction element that selectively fixes the front sun gear to the automatic transmission case;

a fifth friction element that selectively fixes the common carrier to the automatic transmission case; and an output member always connected to the ring gear, the automatic transmission being capable of establishing four forward speeds and one reverse speed by combination of simultaneous engagement of two friction elements selected from the five friction elements, wherein the output member is disposed on one side of the Ravigneaux planetary gear unit, and the first friction element, the second friction element, the third friction element, the fourth friction element, and the fifth friction element are disposed on the other side of the Ravigneaux planetary gear unit, the automatic transmission further including:

a first hub supporting the second friction element on an outer circumferential side thereof, the first hub being connected to a first carrier plate disposed at one end of the common carrier on the one side of the Ravigneaux planetary gear unit, a second hub supporting the fifth friction element on an outer circumferential side thereof, the second hub being connected to a second carrier plate disposed at the other end of the common carrier on the other side of the Ravigneaux planetary gear unit, and a partition member cooperating with the automatic transmission case to define a transmission chamber in which the output member, the Ravigneaux planetary gear unit, and the respective first to fifth friction elements are accommodated;

wherein the output member is supported on a cylindrical portion extending from the partition member toward the Ravigneaux planetary gear unit in an axial direction of the input member.

In a second aspect of the present invention, there is provided the automatic transmission according to the first aspect, wherein the input member is disposed on an inner circumferential side of the Ravigneaux planetary gear unit, and the first hub extends through an outer circumferential side of the input member, and is connected with the first carrier plate, the automatic transmission further including:

a first drum supporting the second friction element on an inner circumferential side thereof, the first drum supporting the first friction element on an outer circumferential side thereof such that the first friction element is overlapped with the second friction element in a radial direction of the input member, the first drum being connected to the input member, a second drum supporting the first friction element on an inner circumferential side thereof, the second drum extending through an outer circumferential side of the first hub and an inner circumferential side of the rear sun gear and being connected to the front sun gear, a third hub supporting the third friction element on an outer circumferential side thereof, the third hub extending through an outer circumferential side of the second drum and being connected to the rear sun gear, and a fourth hub supporting the fourth friction element on an outer circumferential side thereof, the fourth hub being connected to the second drum in such a position that a distance of the fourth hub from the Ravigneaux planetary gear unit is larger than a distance of the first friction element from the Ravigneaux planetary gear unit on the other side of the Ravigneaux planetary gear unit, wherein the second hub is disposed on an outer circumferential side of the third hub.

In a third aspect of the present invention, there is provided the automatic transmission according to the second aspect, wherein the third friction element is arranged on the outer circumferential side of the second friction element such that the third friction element is overlapped with the second friction element in a radial direction of the input member.

In a fourth aspect of the present invention, there is provided the automatic transmission according to the third aspect, wherein the third friction element is arranged on the outer circumferential side of the first friction element such that the third friction element is overlapped with the first friction element in the radial direction of the input member.

BRIEF DESCRIPTION OF THE DRAWINGS

FIG. 5A and FIG. 5B are explanatory diagrams showing a central carrier plate disposed between two sun gears of a Ravigneaux planetary gear unit in an automatic transmission of a comparative example.

FIG. 8A and FIG. 8B are a skeleton diagram and a speed diagram, respectively, which are explanatory diagrams showing a shift operation at a third speed (3rd) in the automatic transmission according to the embodiment.

FIG. 9A and FIG. 9B are respectively a skeleton diagram and a speed diagram, respectively, which are explanatory diagrams showing a shift operation at a fourth speed (4th) in the automatic transmission according to the embodiment.

DETAILED DESCRIPTION OF THE INVENTION

Referring to FIGS. 1-11, an automatic transmission according to an embodiment of the present invention is explained. In this embodiment, the automatic transmission is applied to a front-engine front-wheel-drive engine vehicle (a FF engine vehicle) which has a parallel arrangement of an input shaft and an output shaft.

First, a construction of the automatic transmission according to the embodiment is explained. The construction includes "general construction", "speed change construction" and "arrangement of respective elements within a transmission chamber".

[General Construction]

Figure 1:
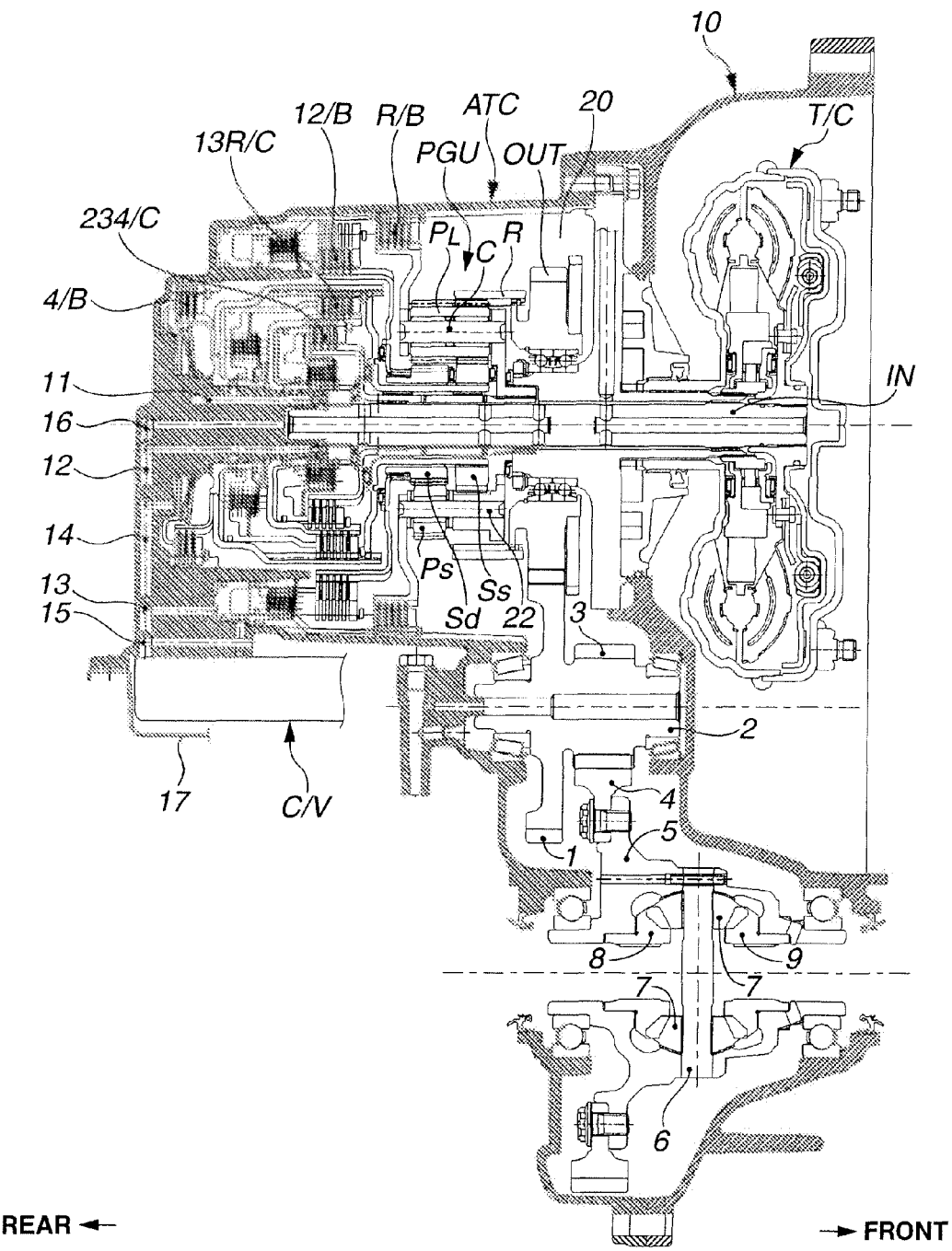
FIG. 1 is a vertical cross section of an automatic transmission according to an embodiment of the present invention, showing a whole construction of the automatic transmission.
Figures 2, 3:
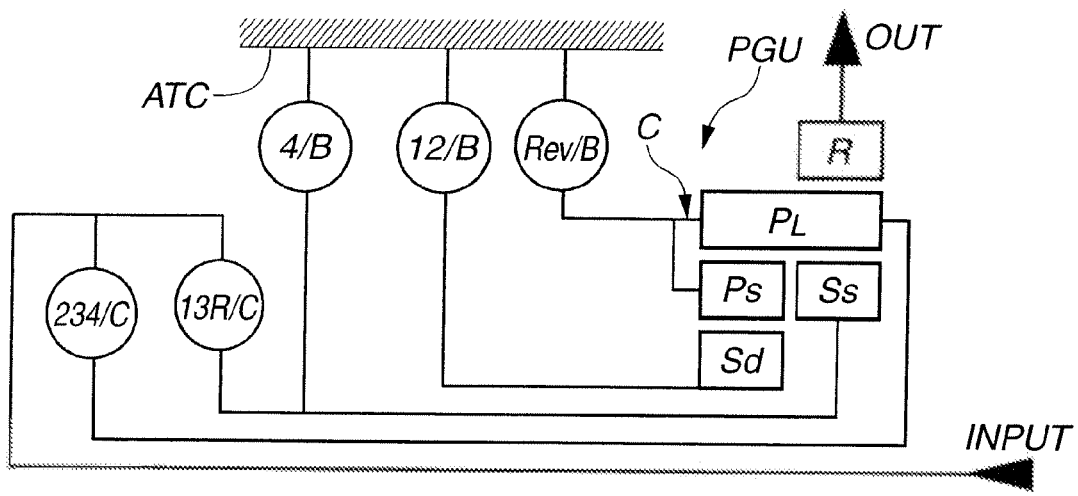
FIG. 2 is a skeleton diagram showing the automatic transmission according to the embodiment of the present invention.
FIG. 3 is a table showing an engagement schedule of five friction elements of the automatic transmission according to the embodiment for establishing four forward speeds and one reverse speed by simultaneous engagement of specific two friction elements selected from the five friction elements.

FIG. 1 is a vertical cross section of the automatic transmission according to the embodiment, showing the general construction thereof. FIG. 2 is a skeleton diagram showing the automatic transmission according to the embodiment. Referring to FIG. 1 and FIG. 2, a construction of planetary gearsets and a construction of friction elements in the automatic transmission are explained.

As shown in FIG. 1 and FIG. 2, the automatic transmission according to the embodiment includes Ravigneaux planetary gear unit PGU, input shaft (i.e., input member) IN, output gear (i.e., output member) OUT, first clutch (i.e., first friction element) 13R/C, second clutch (i.e., second friction element) 234/C, third brake (i.e., third friction element) 12/B, fourth brake (i.e., fourth friction element) 4/B, fifth brake (i.e., fifth friction element) R/B and automatic transmission case ATC.

Ravigneaux planetary gear unit PGU is a composite planetary gearset composed of two planetary gearsets that are a single pinion planetary gearset and a double-pinion planetary gearset. As shown in FIG. 1 and FIG. 2, Ravigneaux planetary gear unit PGU includes front sun gear Ss, rear sun gear Sd, ring gear R, long pinion $P_L$ meshing with front sun gear Ss and ring gear R, short pinion $P_S$ meshing with rear sun gear Sd long pinion $P_L$, and common carrier C on which long pinion $P_L$ and short pinion $P_S$ are rotatably supported.

As shown in FIG. 1, input shaft IN is a shaft to which rotational driving torque transmitted from an engine (i.e., a drive source), not shown, is inputted via torque converter T/C with a lockup clutch.

As shown in FIG. 1, output gear OUT is always connected to ring gear R. Output rotation of output gear OUT is sequentially transmitted to counter gear 1, counter shaft 2, final reduction gear 3, drive gear 4 and differential gear case 5 in this order. The output rotation transmitted to differential gear case 5 is transmitted to pinions 7,7 through pinion mate shaft 6 that makes a unitary rotation with differential gear case 5, and then transmitted to left and right drive axels (not shown) and left and right driving wheels (not shown) through a pair of side gears 8, 9 meshing with pinions 7,7.

First clutch 13R/C is a multiple disc friction clutch that selectively connects input shaft IN and front sun gear Ss at the first speed (1st), the third speed (3rd) and reverse speed (Rev).

Second clutch 234/C is a multiple disc friction clutch that selectively connects input shaft IN and common carrier C at the second speed (2nd), the third speed (3rd) and the fourth speed (4th).

Third brake 12/B is a multiple disc friction brake that selectively fixes rear sun gear Sd to automatic transmission case ATC at the first speed (1st) and the second speed (2nd).

Fourth brake 4/B is a multiple disc friction brake that selectively fixes front sun gear Ss to automatic transmission case ATC at the fourth speed (4th).

Fifth brake R/B is a multiple disc friction brake that selectively fixes common carrier C to automatic transmission case ATC at reverse speed (Rev).

As shown in FIG. 1, automatic transmission case ATC accommodates Ravigneaux planetary gear unit PGU, five friction elements 13R/C, 234/C, 12/B, 4/B, R/B, and the like within an inside space thereof. Converter housing 10 is connected to a drive source side of automatic transmission case ATC. Torque converter T/C is disposed within converter housing 10. Further, oil pump O/P that is rotationally driven by the engine is disposed in a connecting portion between automatic transmission case ATC and converter housing 10. As shown in FIG. 1, automatic transmission case ATC is provided with control valve body C/V and oil pan 17 that accommodates control valve body C/V. Control valve body C/V has a plurality of control valves that produce hydraulic pressures at the respective speeds, and oil passages therein. Collectively formed in a rear portion of automatic transmission case ATC are hydraulic exchange portions which perform hydraulic exchange between oil passages on the side of control valve body C/V and oil passages on the side of automatic transmission case ATC which supply hydraulic pressures to pistons to press friction plates of the respective friction elements. That is, as shown in FIG. 1, radial oil passage portions of first clutch pressure oil passage 11, second clutch pressure oil passage 12, third brake pressure oil passage 13, fourth brake pressure oil passage 14, fifth brake pressure oil passage 15 and lubricating oil passage 16 are collectively formed in a same position in an axial direction of input shaft IN (i.e., in an axial direction of automatic transmission case ATC).

[Speed Change Construction]

FIG. 3 is a table showing an engagement schedule of five friction elements of the automatic transmission according to the embodiment for establishing four forward speeds and one reverse speed by simultaneous engagement of specific two friction elements selected from the five friction elements. Referring to FIG. 3, a speed change construction (a shift construction) for establishing the respective speeds in the automatic transmission according to the embodiment will be explained hereinafter.

As shown in FIG. 3, the first speed (1st) is established by simultaneous engagement of first clutch 13R/C and third brake 12/B. Owing to the simultaneous engagement of first clutch 13R/C and third brake 12/B, input shaft IN and front sun gear Ss are connected with each other, and rear sun gear Sd is fixed to automatic transmission case ATC. In this condition, the first speed (1st) is established.

As shown in FIG. 3, the second speed (2nd) is established by simultaneous engagement of second clutch 234/C and third brake 12/B. Owing to the simultaneous engagement of second clutch 234/C and third brake 12/B, input shaft IN and common carrier C are connected with each other, and rear sun gear Sd is fixed to automatic transmission case ATC. In this condition, the second speed (2nd) is established.

As shown in FIG. 3, the third speed (3rd) is established by simultaneous engagement of first clutch 13R/C and second clutch 234/C. Owing to the simultaneous engagement of first clutch 13R/C and second clutch 234/C, input shaft IN, front sun gear Ss and common carrier C are connected with each other. In this condition, the third speed (3rd) is established.

As shown in FIG. 3, the fourth speed (4th) is established by simultaneous engagement of second clutch 234/C and fourth brake 4/B. Owing to the simultaneous engagement of second clutch 234/C and fourth brake 4/B, input shaft IN and common carrier C are connected with each other, and front sun gear Ss is fixed to automatic transmission case ATC. In this condition, the fourth speed (4th) is established.

As shown in FIG. 3, the reverse speed (Rev) is established by simultaneous engagement of first clutch 13R/C and fifth brake R/B. Owing to the simultaneous engagement of first clutch 13R/C and fifth brake R/B, input shaft IN and front sun gear Ss are connected with each other, and common carrier C is fixed to automatic transmission case ATC. In this condition, the reverse speed (Rev) is established.

As seen from the table shown in FIG. 3, upshift and downshift between speeds adjacent to each other among the four speeds from the first speed (1st) to the fourth speed (4th) are carried out by so-called changeover shift of two friction elements. The term "changeover shift" means that while one of the two friction elements which undergo simultaneous engagement at the preceding speed before shifting is held in an engagement state, the other of the two friction elements is brought into a disengagement state, and at the same time, another friction element is brought into an engagement state, so that the shift from the preceding speed to the adjacent speed to be established is executed. For instance, upon the upshift from the first speed (1st) to the second speed (2nd), while holding third brake 12/B in an engagement state, first clutch 13R/C is brought into a disengagement state, and at the same time, second clutch 234/C is brought into an engagement state.

[Arrangement of Respective Elements within a Transmission Chamber]

Figure 4:
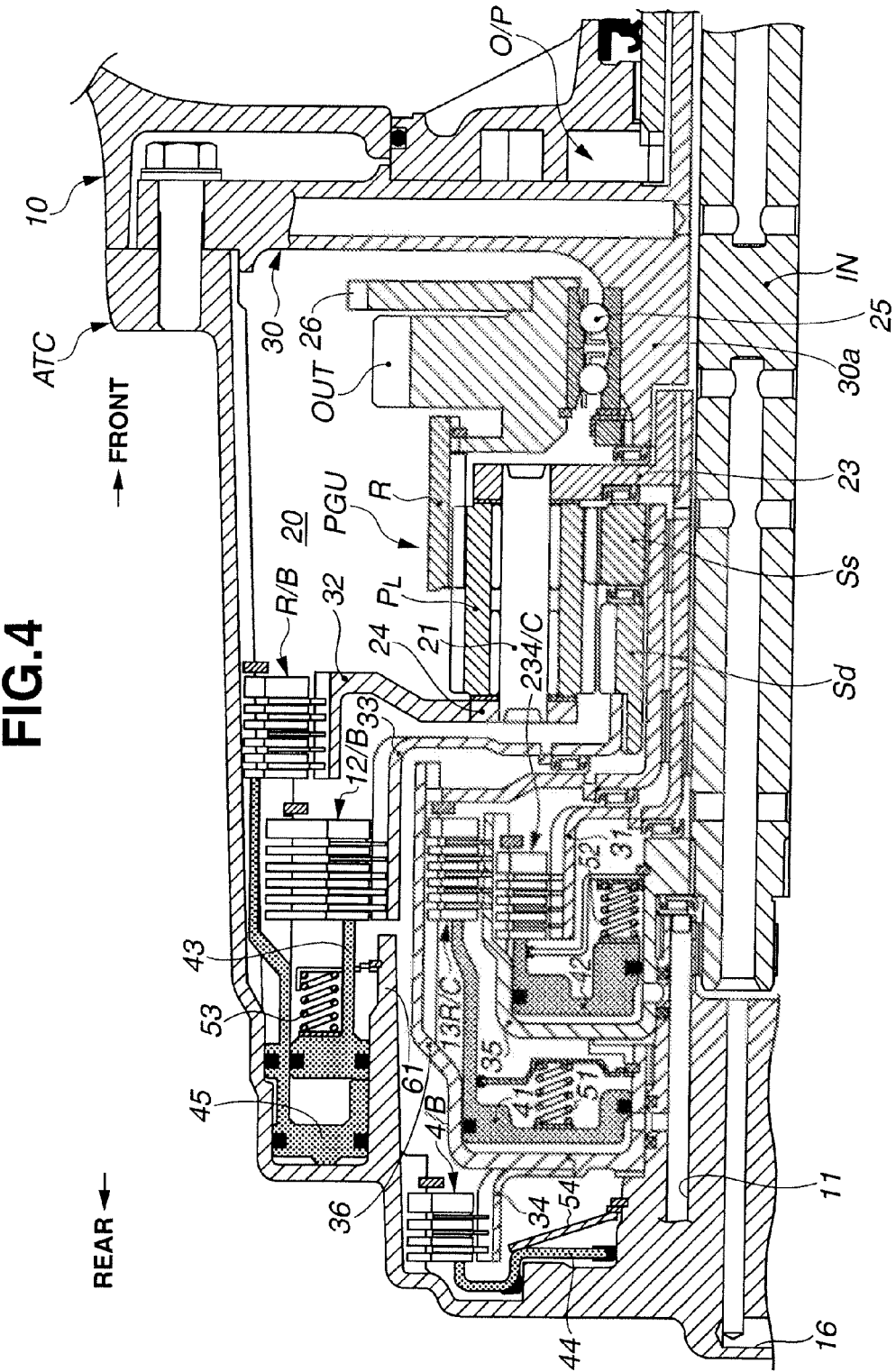
FIG. 4 is an enlarged cross section of the automatic transmission according to the embodiment, showing detailed construction of a Ravigneaux planetary gear unit, an output gear and the respective friction elements which are disposed within a transmission chamber.

As described above, as shown in FIG. 1, input shaft IN, Ravigneaux planetary gear unit PGU, output gear OUT and five friction elements 13R/C, 234/C, 12/B, 4/B, R/B are arranged within the inside space (i.e., transmission chamber 20) of automatic transmission case ATC. Referring to FIG. 4, the arrangement of the respective elements within transmission chamber 20 will be explained hereinafter.

As shown in FIG. 4, transmission chamber 20 is defined as the inside space of automatic transmission case ATC by oil pump housing 30 (as a partition member) which is fixed to an opening at a front end of automatic transmission case ATC. Output gear OUT is disposed within transmission chamber 20 on a front side (i.e., one side) of Ravigneaux planetary gear unit PGU which is located close to the drive source. First clutch 13R/C, second clutch 234/C, third brake 12/B, fourth brake 4/B and fifth brake R/B are collectively disposed on a rear side (i.e., the other side) of Ravigneaux planetary gear unit PGU which is located distant from the drive source.

As shown in FIG. 4, Ravigneaux planetary gear unit PGU is disposed on a rear side of output gear OUT and on an outer circumferential side of input shaft IN. Ravigneaux planetary gear unit PGU includes four rotary elements that are front sun gear Ss, rear sun gear Sd, ring gear R and common carrier C (see FIG. 1). Common carrier C among these rotary elements includes long pinion shaft 21 supporting long pinion $P_L$, short pinion shaft 22 (see FIG. 1) that supports short pinion $P_S$, front carrier plate (i.e., first carrier plate) 23 that supports one end portion of each of pinion shafts 21, 22, and rear carrier plate (i.e., second carrier plate) 24 that supports an opposite end portion of each of pinion shafts 21, 22.

As shown in FIG. 4, input shaft IN is disposed on an inner circumferential side of Ravigneaux planetary gear unit PGU, and output gear OUT is directly connected to ring gear R that is one of the four rotary elements of Ravigneaux planetary gear unit PGU. Output gear OUT is supported on cylindrical portion 30a rearward extending from oil pump housing 30 in the axial direction of input shaft IN, through bearing 25. Parking gear 26 is fixed to a front portion of output gear OUT which is located on a side of oil pump housing 30.

As shown in FIG. 4, the three rotary elements Ss, Sd, C of Ravigneaux planetary gear unit PGU except for ring gear R, and the five friction elements 13R/C, 234/C, 12/B, 4/B, R/B are connected with each other through first hub 31, second hub 32, third hub 33, fourth hub 34, first drum 35 and second drum 36 which are rotary members, respectively.

As shown in FIG. 4, first hub 31 supports friction plates of second clutch 234/C on an outer circumferential side thereof through spline-fitting. First hub 31 extends through the outer circumferential side of input shaft IN in the axial direction of input shaft IN, and is connected to front carrier plate 23 located at a front end of common carrier C.

As shown in FIG. 4, second hub 32 supports friction plates of fifth brake R/B on an outer circumferential side of first hub 31 through spline-fitting. Second hub 32 is connected to rear carrier plate 24 located at a rear end of common carrier C. Second hub 32 is disposed on an outer circumferential side of third hub 33.

As shown in FIG. 4, third hub 33 is disposed between first hub 31 and second hub 32. Third hub 33 supports friction plates of third brake 12/B on an outer circumferential side thereof through spline-fitting. Third hub 33 extends through an outer circumferential side of second drum 36, and extends radially inwardly to be connected to rear sun gear Sd.

As shown in FIG. 4, fourth hub 34 supports friction plates of fourth friction element 4/B on an outer circumferential side thereof through spline-fitting. Fourth hub 34 is connected to a rear portion of second drum 36 in such a position that a distance of fourth hub 34 from Ravigneaux planetary gear unit PGU is larger than a distance of first friction element 13R/C from Ravigneaux planetary gear unit PGU on the other side of Ravigneaux planetary gear unit PGU.

As shown in FIG. 4, first drum 35 supports counterpart friction plates of second clutch 234/C on an inner circumferential side thereof through spline-fitting. First drum 35 also supports friction plates of first clutch 13R/C on an outer circumferential side thereof spline-fitting such that friction plates of first clutch 13R/C is overlapped with the counterpart friction plates of second clutch 234/C in a radial direction of input shaft IN. First drum 35 is connected to a tip end portion (i.e., a rear end portion) of input shaft IN through spline-engagement. That is, first drum 35 is a drum common to second clutch 234/C disposed on the inner circumferential side thereof and first clutch 13R/C disposed on the outer circumferential side thereof.

As shown in FIG. 4, second drum 36 supports counterpart friction plates of first clutch 13R/C on an inner circumferential side thereof through spline-fitting. Second drum 36 extends through an outer circumferential side of first hub 31 and an inner circumferential side of rear sun gear Sd, and is connected to front sun gear Ss through spline-engagement. Second drum 36 includes a drum portion to which the counterpart friction plates of first clutch 13R/C is spline-fitted and fourth hub 34 is connected thereto, and a connecting portion that is connected to front sun gear Ss through spline-engagement. The drum portion and the connecting portion are meshed with each other in a circumferential direction thereof to thereby form second drum 36.

As shown in FIG. 4, first clutch 13R/C is arranged on an outside of second clutch 234/C in a radial direction of input shaft IN (i.e., in a radial direction of automatic transmission case ATC) such that at least a part of first clutch 13R/C is overlapped with second clutch 234/C in the radial direction of input shaft IN. First clutch piston 41 of first clutch 13R/C is disposed in a piston cylinder that is formed in second drum 36 on a rear side of first clutch 13R/C. First clutch return spring 51 is disposed between second drum 36 and first clutch piston 41.

As shown in FIG. 4, second clutch 234/C is arranged on an inside of first clutch 13R/C in the radial direction of input shaft IN such that at least a part of second clutch 234/C is overlapped with first clutch 13R/C in the radial direction of input shaft IN. Second clutch piston 42 of second clutch 234/C is disposed in a piston cylinder that is formed in first drum 35 on a rear side of second clutch 234/C. Second clutch return spring 52 is disposed between first drum 35 and second clutch piston 42.

As shown in FIG. 4, third brake 12/B is arranged on the outside of second clutch 234/C and first clutch 13R/C in the radial direction of input shaft IN such that third brake 12/B is overlapped with second clutch 234/C and first clutch 13R/C in the radial direction of input shaft IN. Third brake piston 43 of third brake 12/B is disposed in a large annular groove-shaped piston cylinder that is located on a rear side of third brake 12/B and defined by automatic transmission case ATC and projecting case portion 61. Projecting case portion 61 extends from a rear side of automatic transmission case ATC into the transmission chamber in the axial direction of input shaft IN. Third brake return spring 53 is disposed between automatic transmission case ATC and third brake piston 43.

As shown in FIG. 4, fourth brake 4/B is arranged in a rear-most position within the transmission chamber. Fourth brake piston 44 of fourth brake 4/B is disposed in a small annular groove-shaped piston cylinder that is located on a rear side of fourth brake 4/B and defined by automatic transmission case ATC. The piston cylinder for fourth brake piston 44 is disposed radially inside of the piston cylinder for third brake piston 43 within transmission chamber 20. Fourth brake return spring 54 is disposed between automatic transmission case ATC and fourth brake piston 44. In this embodiment, fourth brake piston 44 is provided in the form of a coned disc spring.

As shown in FIG. 4, fifth brake R/B is arranged on a front side of third brake 12/B such that fifth brake R/B is overlapped with a part of Ravigneaux planetary gear unit PGU in the radial direction of input shaft IN. Fifth brake piston 45 of fifth brake R/B is disposed in an annular groove-shaped piston cylinder formed in automatic transmission case ATC. Third brake return spring 53 for third brake piston 43 is used in common to a return spring for fifth brake piston 45.

Functions of the automatic transmission according to the embodiment will be explained hereinafter. The functions include "function of speed change at respective speeds", "function of enhancement in NV performance and suppression of upsizing of components" and "function of lubrication of friction elements". "Problems of upsizing of common carrier in comparative example" are explained before explaining the above functions of the automatic transmission according to the embodiment.

[Problems of Upsizing of Common Carrier in Comparative Example]

The automatic transmission as shown in FIG. 9A and FIG. 9B of Japanese Patent Application Unexamined Publication No. 10-169730 is referred to as a comparative example. The automatic transmission of this conventional art aims to establish four speeds by combination of engagement and disengagement of two clutches and three brakes through the use of a Ravigneaux planetary gear unit.

As described in the conventional art, in recent years, there is a strict demand for enhancement of compact design and reduction in cost of automatic transmissions. However, in a layout as shown in the comparative example, a common carrier becomes large in size to thereby cause an increased cost.

Specifically, in the comparative example, a rotary member between the common carrier and a second clutch C-2 is disposed between two sun gears S1, S2. Due to this arrangement, one central carrier plate must be additionally provided at a central portion of the common carrier, which results in upsizing of the common carrier and an increase in cost. Referring to FIG. 5A and FIG. 5B, reasons for the upsizing of the common carrier and the increase in cost are explained in detail.

As shown in FIG. 5A and FIG. 5B, long pinion holes (for instance, three holes) for inserting long pinions must be formed in a doughnut-shaped central carrier plate. Due to the formation of the long pinion holes in the central carrier plate, the central carrier plate is subjected to the following constraints.

1) An outer diameter of the central carrier plate must be increased in order to ensure a wall thickness between a periphery of the respective long pinion holes and an outer periphery of the central carrier plate in a radial direction of the central carrier plate.
2) An inner diameter of the central carrier plate must be reduced in order to ensure a wall thickness between a periphery of the respective long pinion holes and an inner periphery of the central carrier plate in the radial direction of the central carrier plate, so that the sun gears cannot be assembled to the central carrier plate.
3) Since the long pinion holes for inserting the long pinions are opened into the central carrier plate, a wall thickness of the central carrier plate in an axial direction of the central carrier plate must be increased in order to ensure a strength of the central carrier plate.

Accordingly, the central carrier plate additionally fitted must be a plate that has a large outer diameter and a large thickness so as to meet with the above constraints 1), 2) and 3). As a result, the common carrier is upsized in both the radial direction and the axial direction. The additional provision of the central carrier plate causes an increase in cost.

Further, in a case where the long pinion holes for inserting the long pinions are not formed in the central carrier plate in order not to subject the central carrier plate to the above constraints 1), 2) and 3), it is necessary to divide the respective long pinions into two halves. That is, in a case where a Ravigneaux planetary gear unit uses three long pinions, the number of long pinions becomes six by dividing the respective three long pinions into two halves, so that the number of parts is increased to thereby cause an increased cost.

[Function of Speed Change at Respective Speeds]

Ravigneaux planetary gear unit PGU of the automatic transmission according to the embodiment includes front sun gear Ss, rear sun gear Sd, ring gear R and common carrier C as four rotary elements having a rotation speed relationship therebetween which is indicated by a straight line in a speed diagram. Referring to FIG. 6A to FIG. 10B, the function of speed change at respective speeds which is obtained by changing the rotation speed relationship between the four rotary elements, will be explained hereinafter.

(First Speed)

Figure 6B:
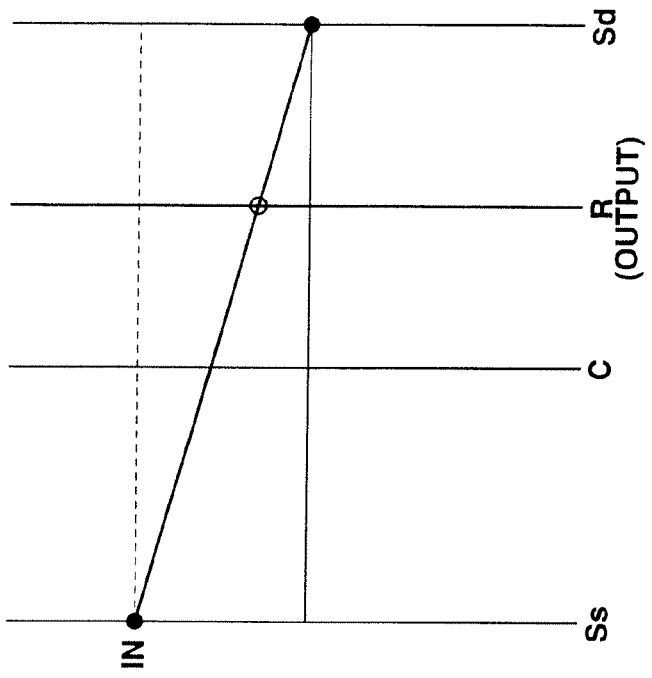
FIG. 6A and FIG. 6B are a skeleton diagram and a speed diagram, respectively, which are explanatory diagrams showing a shift operation at a first speed (1st) in the automatic transmission according to the embodiment of the present invention.
Figure 6A:
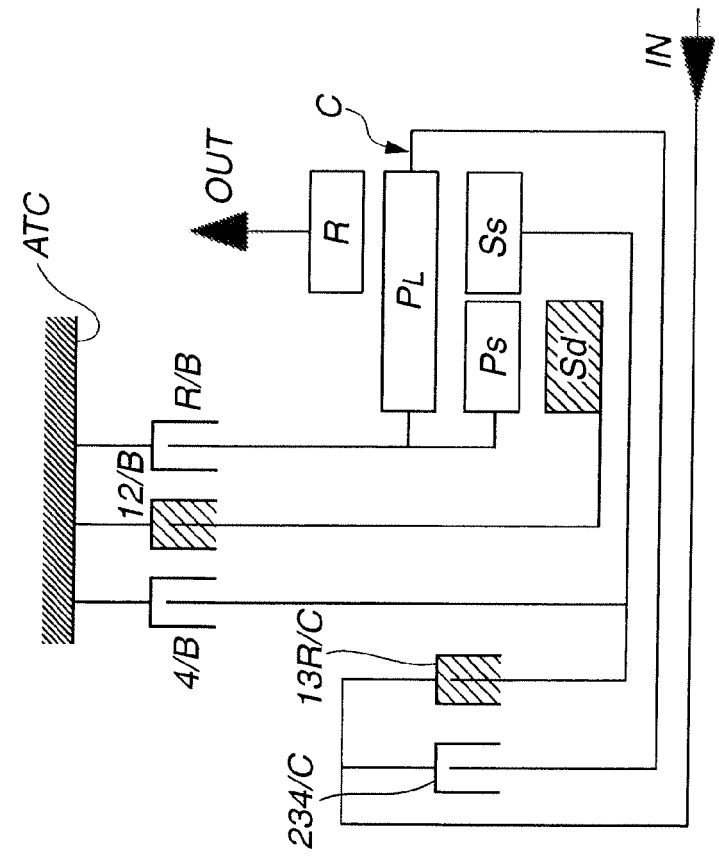

At the first speed (1st), as indicated by hatching in FIG. 6A, first clutch 13R/C and third brake 12/B are brought into simultaneous engagement. Owing to the engagement of third brake 12/B, rear sun gear Sd is fixed to automatic transmission case ATC. In this condition, when input rotation speed from the drive source is inputted to front sun gear Ss via input shaft IN, rear sun gear Sd is in the fixed state, and therefore, a rotation speed relationship between front sun gear Ss, common carrier C, ring gear R and rear sun gear Sd is determined as indicated by a straight line in FIG. 6B. That is, the rotation speed of common carrier C is reduced as compared to that of front sun gear Ss, and the rotation speed of ring gear R is reduced as compared to that of common carrier C. The reduced rotation speed of ring gear R which is lower than the rotation speed inputted to front sun gear Ss is transmitted to output gear OUT without being changed. The first speed (i.e., first underdrive speed) is thus established.

(Second Speed)

Figure 7B:
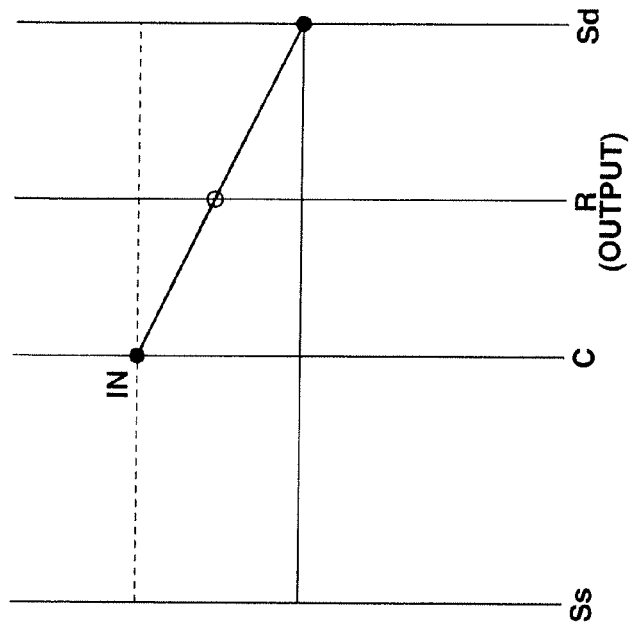
FIG. 7A and FIG. 7b are a skeleton diagram and a speed diagram, respectively, which are explanatory diagrams showing a shift operation at a second speed (2nd) in the automatic transmission according to the embodiment.
Figure 7A:
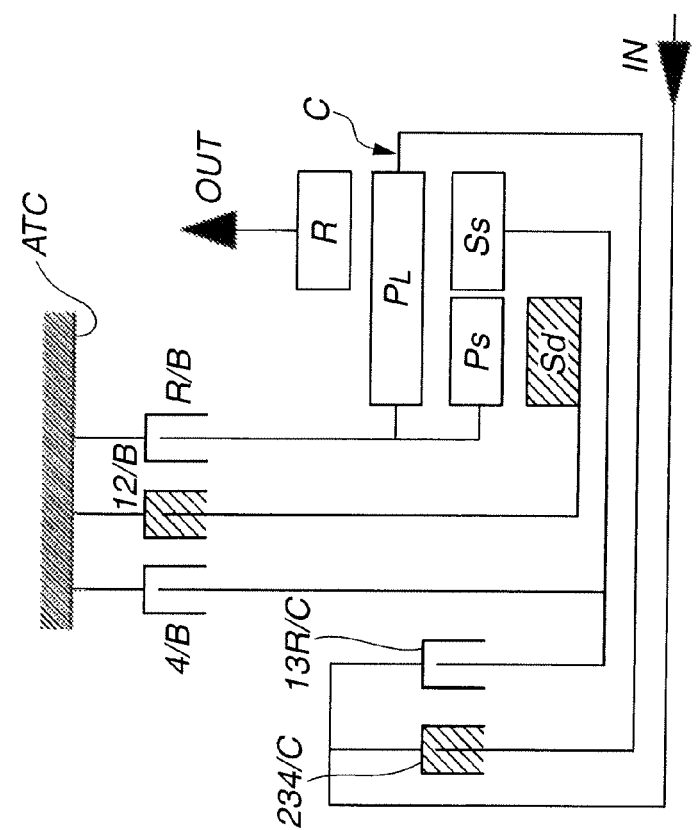

At the second speed (2nd), as indicated by hatching in FIG. 7A, second clutch 234/C and third brake 12/B are brought into simultaneous engagement. Owing to the engagement of third brake 12/B, rear sun gear Sd is fixed to automatic transmission case ATC. In this condition, when input rotation speed from the drive source is inputted to common carrier C via input shaft IN, rear sun gear Sd is in the fixed state, and therefore, a rotation speed relationship between common carrier C, ring gear R and rear sun gear Sd is determined as indicated by a straight line in FIG. 7B. That is, the rotation speed of ring gear R is reduced as compared to that of common carrier C. The reduced rotation speed of ring gear R which is lower than the rotation speed inputted to common carrier C is transmitted to output gear OUT without being changed. The second speed (i.e., second underdrive speed) is thus established.

(Third Speed)

At the third speed (3rd), as indicated by hatching in FIG. 8A, first clutch 13R/C and second clutch 234/C are brought into simultaneous engagement. In this condition, when input rotation speed from the drive source is inputted to front sun gear Ss and common carrier C via input shaft IN, front sun gear Ss, common carrier C and ring gear R are allowed to make a unitary rotation, and therefore, a rotation speed relationship between front sun gear Ss, common carrier C, ring gear R and rear sun gear Sd is determined as indicated by a straight line in FIG. 8B. The rotation speed of ring gear R (i.e., the input rotation speed) which is same as the rotation speed inputted to front sun gear Ss and common carrier C is transmitted to output gear OUT without being changed. The third speed (i.e., direct drive speed) is thus established.

(Fourth Speed)

At the fourth speed (4th), as indicated by hatching in FIG. 9A, second clutch 234/C and fourth brake 4/B are brought into simultaneous engagement. Owing to the engagement of fourth brake 4/B, front sun gear Ss is fixed to automatic transmission case ATC. In this condition, when input rotation speed from the drive source is inputted to common carrier C via input shaft IN, front sun gear Ss is in the fixed state, and therefore, a rotation speed relationship between front sun gear Ss, common carrier C and ring gear R is determined as indicated by a straight line in FIG. 9B. That is, the rotation speed of ring gear R is increased as compared to the rotation speed (i.e., the input rotation speed) of common carrier C. The increased rotation speed of ring gear R which is higher than the rotation speed inputted to common carrier C is transmitted to output gear OUT without being changed. The fourth speed (i.e., overdrive speed) is thus established.

(Reverse Speed)

Figure 10B:
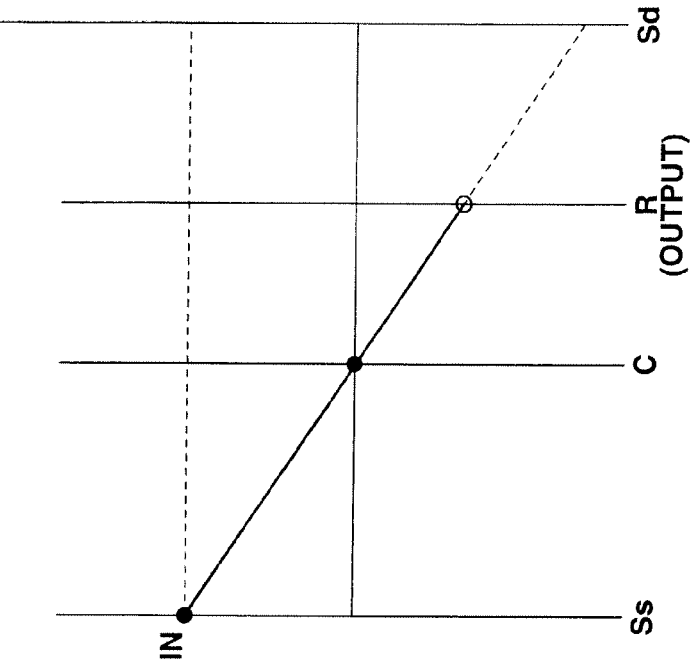
FIG. 10A and FIG. 10B are a skeleton diagram and a speed diagram, respectively, which are explanatory diagrams showing a shift operation at a reverse speed (Rev) in the automatic transmission according to the embodiment.
Figure 10A:
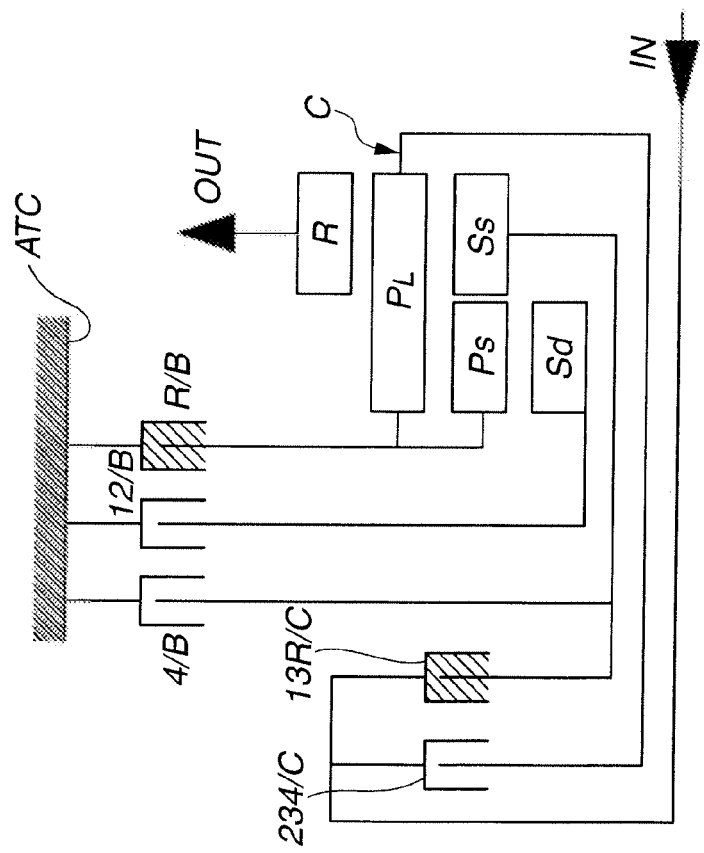

At the reverse speed (Rev), as indicated by hatching in FIG. 10A, first clutch 13R/C and fifth brake R/B are brought into simultaneous engagement. Owing to the engagement of fifth brake R/B, common carrier C is fixed to automatic transmission case ATC. In this condition, when input rotation speed from the drive source is inputted to front sun gear Ss via input shaft IN, common carrier C is in the fixed state, and therefore, a rotation speed relationship between front sun gear Ss, common carrier C and ring gear R is determined as indicated by a straight line in FIG. 6B. That is, the rotation of ring gear R which has a direction opposite to that of front sun gear Ss and a speed reduced as compared to that of front sun gear Ss, is generated. The rotation (i.e., speed-reduced reverse rotation) of ring gear R which is changed from the rotation inputted to front sun gear Ss is transmitted to output gear OUT without being changed in speed and direction. The reverse speed is thus established.

[Function of Enhancement in NV Performance and Suppression of Upsizing of Components]

In order to achieve practical use of an automatic transmission having the concept of small size and low cost, it is necessary to solve problems encountered in the comparative example which include "deterioration in NV performance of an output gear", "increase in cost due to upsizing of a control valve body" and "increase in cost due to upsizing of a common carrier". In the following, there are explained the functions of enhancement in installability to vehicles and suppression of upsizing of components of the automatic transmission according to the embodiment which can solve the above problems.

(a) Enhancement in NV Performance of Output Gear OUT:

In the automatic transmission according to the embodiment, no friction element is arranged on the front side of output gear OUT, and output gear OUT is supported on cylindrical portion 30a extending rearward from oil pump housing 30 (i.e., a partition member) in the axial direction of input shaft IN, through bearing 25. That is, output gear OUT is supported by oil pump housing 30 fixed to automatic transmission case ATC through bearing 25 without separately providing an intermediate wall to support output gear OUT. With this layout, for instance, as compared to a case where an output gear is supported through a hub member of a friction element, a backlash that occurs upon supporting output gear OUT can be reduced to thereby suppress generation of noise and vibration.

(b) Suppression of Upsizing of Control Valve Body C/V to Thereby Reduce the Cost:

In the automatic transmission according to the embodiment, five friction elements 13R/C, 234/C, 12/B, 4/B, R/B are collectively arranged on the rear side of output gear OUT disposed on the front side of Ravigneaux planetary gear unit PGU, within transmission chamber 20. With this layout, it is possible to collectively arrange hydraulic exchange portions in which hydraulic exchange between oil passages on the side of control valve body C/V and oil passages on the side of automatic transmission case ATC which supply hydraulic pressures to pistons 41, 42, 43, 44, 45 which respectively press the friction plates of five friction elements 13R/C, 234/C, 12/B, 4/B, R/B, is performed. In the automatic transmission according to the embodiment, as shown in FIG. 1, radial oil passage portions of respective oil passages 11, 12, 13, 14, 15, 16 extending from control valve body C/V are collectively formed in the rear portion of automatic transmission case ATC and located in the same position in the axial direction of input shaft IN. With this arrangement, it is not necessary to provide the hydraulic exchange portions on the front side of the output member (i.e., output gear OUT). Accordingly, it is not necessary to upsize control valve body C/V in order to connect the oil passages of on the side of control valve body C/V and the oil passages on the side of automatic transmission case ATC with each other on the front side of the output member. As a result, upsizing of control valve body C/V can be suppressed to thereby reduce the cost. Further, owing to suppression of upsizing of control valve body C/V, a freedom of layout of a strainer and a CPU can be enhanced, and oil pan 17 in which control valve body C/V is accommodated can be downsized to thereby enhance installability to vehicles.

(c) Suppression of Upsizing of Common Carrier to Thereby Reduce the Cost:

In the automatic transmission according to the embodiment, first hub 31 and second hub 32 are respectively connected to front carrier plate 23 and rear carrier plate 24 which are disposed on both ends of common carrier C. That is, a rotary member between common carrier C and second clutch 234/C is connected to existing front carrier plate 23 connected to the front end portion of common carrier C in order to support long pinions $P_L$ and short pinions $P_S$. With this arrangement, it is not necessary to additionally provide a central carrier plate that is disposed at a central portion of a common carrier and between two sun gears as explained in the comparative example. Thus, in the automatic transmission according to the embodiment, common carrier C is connected at opposed ends with respective hubs 31, 32. Accordingly, it is possible to suppress upsizing of the common carrier which is caused due to addition of a central carrier plate, and reduce the cost.

[Function of Lubricating Friction Elements]

In the automatic transmission according to the embodiment, upon carrying out shift between the first speed, the second speed and the third speed, changeover control using first clutch 13R/C, second clutch 234/C and third brake 12/B is executed. Therefore, it is important to well control lubrication of these three friction elements 13R/C, 234/C, 12/B. Function of lubricating the friction elements 13R/C, 234/C, 12/B will be explained hereinafter by referring to FIG. 11.

First, upon carrying out shift between the first speed and the second speed, as shown in FIG. 3, changeover control for changeover between first clutch 13R/C and second clutch 234/C is conducted. During the changeover control for changeover between first clutch 13R/C and second clutch 234/C, first clutch 13R/C and second clutch 234/C are in a slip state. Therefore, upon carrying out the shift between the first speed and the second speed, first clutch 13R/C and second clutch 234/C must be lubricated and cooled.

Upon carrying out shift between the second speed and the third speed, as shown in FIG. 3, changeover control for changeover between first clutch 13R/C and third brake 12/B is conducted. During the changeover control for changeover between first clutch 13R/C and third brake 12/B, first clutch 13R/C and third brake 12/B are in a slip state. Therefore, upon carrying out the shift between the second speed and the third speed, first clutch 13R/C and third brake 12/B must be lubricated and cooled.

In the automatic transmission according to the embodiment, first clutch 13R/C is arranged on an outer circumferential side of second clutch 234/C such that first clutch 13R/C is overlapped with at least a part of second clutch 234/C in the radial direction of input shaft IN. Third brake 12/B is arranged on an outer circumferential side of first clutch 13R/C such that third brake 12/B is overlapped with at least a part of first clutch 13R/C in the radial direction of input shaft IN. With this arrangement, lubrication of first clutch 13R/C, second clutch 234/C and third brake 12/B is effectively performed.

For instance, in a case where first clutch 13R/C and second clutch 234/C are arranged to be distant from each other or disposed adjacent to each other in the axial direction of input shaft IN, a lubricating oil used to lubricate and cool first clutch 13R/C is merely returned to an oil reservoir so that lubrication efficiency is lowered.

Figure 11:
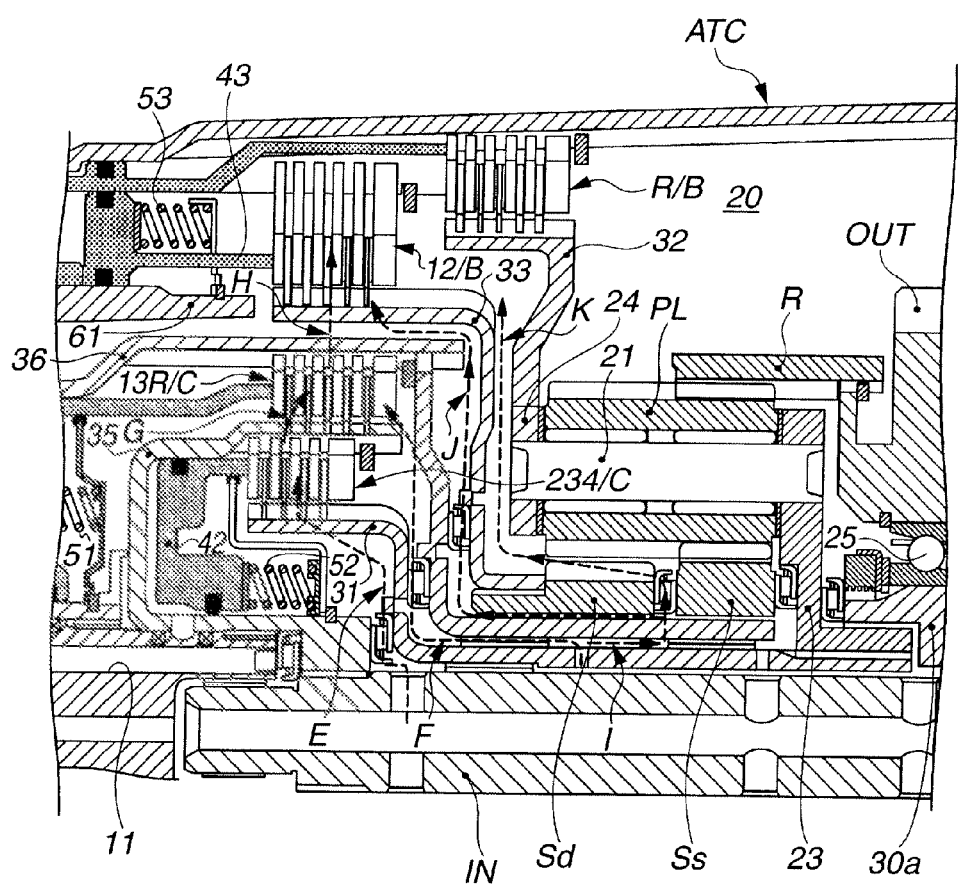
FIG. 11 is an explanatory diagram showing a lubricating oil path to the respective friction elements in the automatic transmission according to the embodiment.

In contrast, in the automatic transmission according to the embodiment, a lubricating oil supplied to a rear side of first hub 31 through a lubricating oil passage formed in input shaft IN flows radially outwardly within transmission chamber 20 as indicated by arrow E shown in FIG. 11. The lubricating oil then passes through a through hole (not shown) formed in first hub 31, and flows into second clutch 234/C to thereby lubricate and cool second clutch 234/C. Meanwhile, respective drums 35, 36 and respective hubs 31, 32, 33, 34 are formed with through holes (not shown) through which the lubricating oil is allowed to flow radially outwardly within transmission chamber 20. The through holes form a part of respective lubricating oil paths.

Further, a lubricating oil supplied to a radial clearance between first hub 31 and second drum 36 through a lubricating oil passage formed in input shaft IN flows along second drum 36 rearward in the axial direction of input shaft IN as indicated by arrow F shown in FIG. 11. The lubricating oil then turns outwardly in a radial direction of second drum 36, and passes through a clearance between opposed surfaces of first hub 31 and second drum 36 to thereby lubricate and cool first clutch 13R/C. In addition, after lubricating and cooling second clutch 234/C, the lubricating oil flows in a radially outward direction of second clutch 234/C, and passes through the hole formed in first drum 35 as indicated by arrow G shown in FIG. 11. The lubricating oil then merges into the flow of the lubricating oil as indicated by arrow F shown in FIG. 11, and lubricates and cools first clutch 13R/C.

Further, after lubricating and cooling second clutch 234/C and first clutch 13R/C, the lubricating oil flows in a radially outward direction of first clutch 13R/C, and passes through the holes respectively formed in second drum 36 and third hub 33 as indicated by arrow H shown in FIG. 11, thereby lubricating and cooling third brake 12/B.

Further, the lubricating oil supplied to the radial clearance between first hub 31 and second drum 36 through the lubricating oil passage formed in input shaft IN flows along second drum 36 forward in the axial direction of input shaft IN as indicated by arrow I shown in FIG. 11. The lubricating oil then passes through the hole formed in second drum 36, and separates into two branches which are one flowing rearward in the axial direction of input shaft IN and the other flowing outward in the radial direction of input shaft IN. The one of the two branches flows rearward through a radial clearance between second drum 36 and rear sun gear Sd, and then turns in radially outward direction thereof as indicated by arrow J shown in FIG. 11. The one branch J then passes through a radial clearance between second drum 36 and third hub 33, and merges into the flow H to thereby lubricate and cool third brake 12/B. The other branch flows rearward through a radial clearance between long pinion $P_L$ and rear sun gear Sd, and then turns in radially outward direction thereof as indicated by arrow K shown in FIG. 11. The other branch then passes through a radial clearance between second hub 32 and third hub 33, and lubricates and cools fifth brake R/B.

In the automatic transmission according to the embodiment, thus the lubricating oil lubricates and cools first clutch 13R/C subsequent to lubricating and cooling the friction plates of second clutch 234/C. As a result, lubrication of second clutch 234/C and first clutch 13R/C can be efficiently performed. Accordingly, upon carrying out the shift between the first speed and the second speed, the lubrication and cooling of first clutch 13R/C and second 234/C as demanded can be achieved with a high efficiency.

Further, in the automatic transmission according to the embodiment, the lubricating oil lubricates and cools third brake 12/B subsequent to lubricating and cooling the friction plates of first clutch 13R/C. As a result, lubrication of first clutch 13R/C and third brake 12/B can be efficiently performed. Accordingly, upon carrying out the shift between the second speed and the third speed, the lubrication and cooling of first clutch 13R/C and third brake 12/B as demanded can be achieved with a high efficiency.

The automatic transmission according to the embodiment can attain the following effects.

(1) The automatic transmission according to the embodiment includes Ravigneaux planetary gear unit PGU including front sun gear Ss, rear sun gear Sd, ring gear R, long pinion $P_L$ meshing with the front sun gear Ss and the rear sun gear Sd, short pinion Ps meshing with the rear sun gear Sd and the long pinion $P_L$, and common carrier C on which the long pinion $P_L$ and the short pinion Ps are rotatably supported; an input member (input shaft IN) to which rotation of a drive source is inputted; a first friction element (first clutch 13R/C) that selectively connects the input member (input shaft IN) and the front sun gear Ss with each other; a second friction element (second clutch 234/C) that selectively connects the input member (input shaft IN) and the common carrier C with each other; a third friction element (third brake 12/B) that selectively fixes the rear sun gear Sd to automatic transmission case ATC; a fourth friction element (fourth brake 4/B) that selectively fixes the front sun gear Ss to the automatic transmission case ATC; a fifth friction element (fifth brake R/B) that selectively fixes the common carrier C to the automatic transmission case ATC; and an output member (output gear OUT) always connected to the ring gear R. The automatic transmission is capable of establishing four forward speeds and one reverse speed by combination of simultaneous engagement of two friction elements selected from the five friction elements, wherein the output member (output gear OUT) is disposed on one side of the Ravigneaux planetary gear unit PGU, and the first friction element (first clutch 13R/C), the second friction element (second clutch 234/C), the third friction element (third brake 12/B), the fourth friction element (fourth brake 4/B), and the fifth friction element (fifth brake R/B) are disposed on the other side of the Ravigneaux planetary gear unit PGU. The automatic transmission further includes first hub 31 supporting the second friction element (second clutch 234/C) on an outer circumferential side thereof, the first hub 31 being connected to a first carrier plate (front carrier plate 23) disposed at one end of the common carrier C on the one side of the Ravigneaux planetary gear unit PGU; second hub 32 supporting the fifth friction element (fifth brake R/B) on an outer circumferential side of, the second hub 32 being connected to a second carrier plate (rear carrier plate 24) disposed at the other end of the common carrier C on the other side of the Ravigneaux planetary gear unit PGU; and a partition member (oil pump housing 30) cooperating with the automatic transmission case ATC to define transmission chamber 20 in which the output member (output gear OUT), the Ravigneaux planetary gear unit PGU, and the respective first to fifth friction elements 13R/C, 234/C, 12/B, 4/B, R/B are accommodated. The output member (output gear OUT) is supported on cylindrical portion 30a extending from the partition member (oil pump housing 30) toward the Ravigneaux planetary gear unit PGU in an axial direction of the input member (input shaft IN).

With this arrangement, it is possible to enhance NV performance of the output member (output gear OUT) and suppress upsizing of control valve body C/V and common carrier C to thereby reduce the cost.

(2) The input member (input shaft IN) is disposed on an inner circumferential side of the Ravigneaux planetary gear unit PGU. The first hub 31 extends through an outer circumferential side of the input member (input shaft IN), and is connected with the first carrier plate (front carrier plate 23). The automatic transmission further includes first drum 35 supporting the second friction element (second clutch 234/C) on an inner circumferential side thereof and supporting the first friction element (first clutch 13R/C) on an outer circumferential side thereof such that the first friction element (first clutch 13R/C) is overlapped with the second friction element (second clutch 234/C) in a radial direction of the input member (input shaft IN), the first drum 35 being connected to the input member (input shaft IN); second drum 36 supporting the first friction element (first clutch 13R/C) on an inner circumferential side thereof, the second drum 36 extending through an outer circumferential side of the first hub 31 and an inner circumferential side of the rear sun gear Sd and being connected to the front sun gear Ss; third hub 33 supporting the third friction element (third brake 12/B) on an outer circumferential side thereof, the third hub 33 extending through an outer circumferential side of the second drum 36 and being connected to the rear sun gear Sd; and fourth hub 34 supporting the fourth friction element (fourth brake 4/B) on an outer circumferential side thereof, the fourth hub 34 being connected to the second drum 36 in such a position that a distance of the fourth hub 34 from the Ravigneaux planetary gear unit PGU is larger than a distance of the first friction element (13R/C) from the Ravigneaux planetary gear unit PGU on the other side of the Ravigneaux planetary gear unit PGU, wherein the second hub (32) is disposed on an outer circumferential side of the third hub (33).

With this arrangement of the hubs 31, 32, 33, 34 and the drums 35, 36, in addition to the effect (1), the five friction elements 13R/C, 234/C, 12/B, 4/B, R/B can be collectively arranged on the other side of the Ravigneaux planetary gear unit PGU. Further, it is possible to efficiently carry out lubrication of the first friction element (first clutch 13R/C) and the second friction element (second clutch 234/C) which are used in changeover shift upon carrying out shift between the first speed and the second speed.

(3) The third friction element (third brake 12/B) is arranged on the outer circumferential side of the second friction element (second clutch 234/C) such that the third friction element (third brake 12/B) is overlapped with the second friction element (second clutch 234/C) in the radial direction of the input member (input shaft IN). With this arrangement, in addition to the effect (2), it is possible to efficiently carry out lubrication of the first friction element (first clutch 13R/C) and the third friction element (third brake 12/B) which are used in changeover shift upon carrying out shift between the second speed and the third speed.

The present invention is not limited to the embodiment described above, and can be modified as follows without departing from the scope of the invention.

In the automatic transmission according to the embodiment, oil pump housing 30 in which oil pump O/P is accommodated is used as a partition member, and supports output gear OUT. However, oil pump O/P can be disposed on a shaft provided independently of input shaft IN, and output gear OUT can be supported by a partition member that defines the transmission chamber.

Further, the automatic transmission according to the embodiment can be applied to various types of vehicles such as a front-engine rear-wheel-drive engine vehicle (a FR engine vehicle) having a parallel arrangement of an input shaft and an output shaft, a hybrid vehicle using at least one of an engine and a motor as a drive source, an electric vehicle using a motor as a drive source, and a fuel cell powered vehicle without being particularly limited to a front-engine front-wheel-drive engine vehicle (a FF engine vehicle).

This application is based on a prior Japanese Pat. Application Ser. No. 2011-126825 filed on Jun. 7, 2011. The entire contents of the Japanese Patent Application No. 2011-126825 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. An automatic transmission comprising:
a Ravigneaux planetary gear unit comprising a front sun gear, a rear sun gear, a ring gear, a long pinion meshing with the front sun gear and the ring gear, a short pinion meshing with the rear sun gear and the long pinion, and a common carrier on which the long pinion and the short pinion are rotatably supported;
an input member to which rotation of a drive source is inputted;
a first friction element that selectively connects the input member and the front sun gear with each other;
a second friction element that selectively connects the input member and the common carrier with each other;
a third friction element that selectively fixes the rear sun gear to an automatic transmission case;
a fourth friction element that selectively fixes the front sun gear to the automatic transmission case;
a fifth friction element that selectively fixes the common carrier to the automatic transmission case; and
an output member always connected to the ring gear,
the automatic transmission being capable of establishing four forward speeds and one reverse speed by combination of simultaneous engagement of two friction elements selected from the first to fifth friction elements,
wherein the output member is disposed on one side of the Ravigneaux planetary gear unit, and
the first friction element, the second friction element, the third friction element, the fourth friction element, and the fifth friction element are disposed on the other side of the Ravigneaux planetary gear unit,
the automatic transmission further comprising:
a first hub supporting the second friction element on an outer circumferential side thereof, the first hub being connected to a first carrier plate disposed at one end of the common carrier on the one side of the Ravigneaux planetary gear unit,
a second hub supporting the fifth friction element on an outer circumferential side thereof, the second hub being connected to a second carrier plate disposed at the other end of the common carrier on the other side of the Ravigneaux planetary gear unit, and
a partition member cooperating with the automatic transmission case to define a transmission chamber in which the output member, the Ravigneaux planetary gear unit, and the respective first to fifth friction elements are accommodated;
wherein the output member is supported on a cylindrical portion extending from the partition member toward the Ravigneaux planetary gear unit in an axial direction of the input member.

2. The automatic transmission as claimed in claim 1, wherein the input member is disposed on an inner circumferential side of the Ravigneaux planetary gear unit, and
the first hub extends through an outer circumferential side of the input member, and is connected with the first carrier plate,
the automatic transmission further comprising:
a first drum supporting the second friction element on an inner circumferential side thereof, the first drum supporting the first friction element on an outer circumferential side thereof such that the first friction element is overlapped with the second friction element in a radial direction of the input member, the first drum being connected to the input member, a second drum supporting the first friction element on an inner circumferential side thereof, the second drum extending through an outer circumferential side of the first hub and an inner circumferential side of the rear sun gear and being connected to the front sun gear, a third hub supporting the third friction element on an outer circumferential side thereof, the third hub extending through an outer circumferential side of the second drum and being connected to the rear sun gear, and a fourth hub supporting the fourth friction element on an outer circumferential side thereof, the fourth hub being connected to the second drum in such a position that a distance of the fourth hub from the Ravigneaux planetary gear unit is larger than a distance of the first friction element from the Ravigneaux planetary gear unit on the other side of the Ravigneaux planetary gear unit, wherein the second hub is disposed on an outer circumferential side of the third hub.

3. The automatic transmission as claimed in claim 2, wherein the third friction element is arranged on the outer circumferential side of the second friction element such that the third friction element is overlapped with the second friction element in a radial direction of the input member.

4. The automatic transmission as claimed in claim 3, wherein the third friction element is arranged on the outer circumferential side of the first friction element such that the third friction element is overlapped with the first friction element in the radial direction of the input member.

\* \* \* \* \*